: US 7,482,918 B2
: Jan. 27, 2009

(12) United States Patent
Allen

(10) Patent No.: US 7,482,918 B2
(45) Date of Patent: Jan. 27, 2009

(54) DETECTION SYSTEM AND METHOD FOR DETERMINING AN ALARM CONDITION THEREIN

(75) Inventor: Les Allen, Farnborough (GB)

(73) Assignee: May & Scofield Limited, Hampshire (GB)

(*) Notice: Subject to any disclaimer, the term of this patent is extended or adjusted under 35 U.S.C. 154(b) by 151 days.

(21) Appl. No.: 11/326,741

(22) Filed: Jan. 6, 2006

(65) Prior Publication Data
US 2006/0192669 A1 Aug. 31, 2006

(30) Foreign Application Priority Data
Jan. 10, 2005 (GB) ............... 0500392.6

(51) Int. Cl.
G08B 29/00 (2006.01)

(52) U.S. Cl. .............. 340/506; 340/540; 340/522

(58) Field of Classification Search ........ 340/522, 340/566, 540, 541, 506, 507, 504
See application file for complete search history.

(56) References Cited

U.S. PATENT DOCUMENTS

| 3,723,738 | A | | 3/1973 | Brenner et al. | |
| 3,866,198 | A | * | 2/1975 | Cohen | 340/522 |
| 4,195,286 | A | | 3/1980 | Galvin | |
| 4,206,451 | A | | 6/1980 | Kurschner | |
| 4,437,089 | A | | 3/1984 | Achard | |
| 4,479,115 | A | * | 10/1984 | Holzhauer | 340/611 |
| 4,570,157 | A | | 2/1986 | Kodaira | |
| 4,625,199 | A | | 11/1986 | Pantus | |
| 4,764,755 | A | | 8/1988 | Pedtke et al. | |
| 4,882,567 | A | * | 11/1989 | Johnson | 340/522 |
| 5,107,249 | A | | 4/1992 | Johnson | |
| 5,331,308 | A | * | 7/1994 | Buccola et al. | 340/522 |
| 5,510,767 | A | * | 4/1996 | Smith | 340/566 |
| 5,581,236 | A | | 12/1996 | Hoseit et al. | |
| 5,581,237 | A | * | 12/1996 | DiPoala | 340/554 |
| 5,701,117 | A | * | 12/1997 | Platner et al. | 340/567 |
| 6,163,253 | A | * | 12/2000 | Yaron et al. | 340/436 |
| 6,188,318 | B1 | * | 2/2001 | Katz et al. | 340/545.3 |
| 7,106,193 | B2 | * | 9/2006 | Kovach | 340/541 |
| 7,126,476 | B2 | * | 10/2006 | Alkelai et al. | 340/565 |
| 7,129,833 | B2 | * | 10/2006 | Albert | 340/521 |

* cited by examiner

Primary Examiner—George A Bugg
Assistant Examiner—Hoi C Lau
(74) Attorney, Agent, or Firm—Rader, Fishman & Grauer PLLC

(57) ABSTRACT

A method (300) for determining an alarm condition for a confined space comprises detecting motion or an intrusion (305) in the confined space by a secondary sensor and generating (310) an alarm signal by the secondary sensor in response to detected motion or an intrusion. The method further comprises the steps of determining (315) whether the alarm signal represents a false alarm condition; and inhibiting (325) a primary sensor in response to a determined false alarm condition. The provision of a secondary sensor is used to identify false alarms and inhibit operation of the primary sensor or alarm in response thereto.

13 Claims, 3 Drawing Sheets

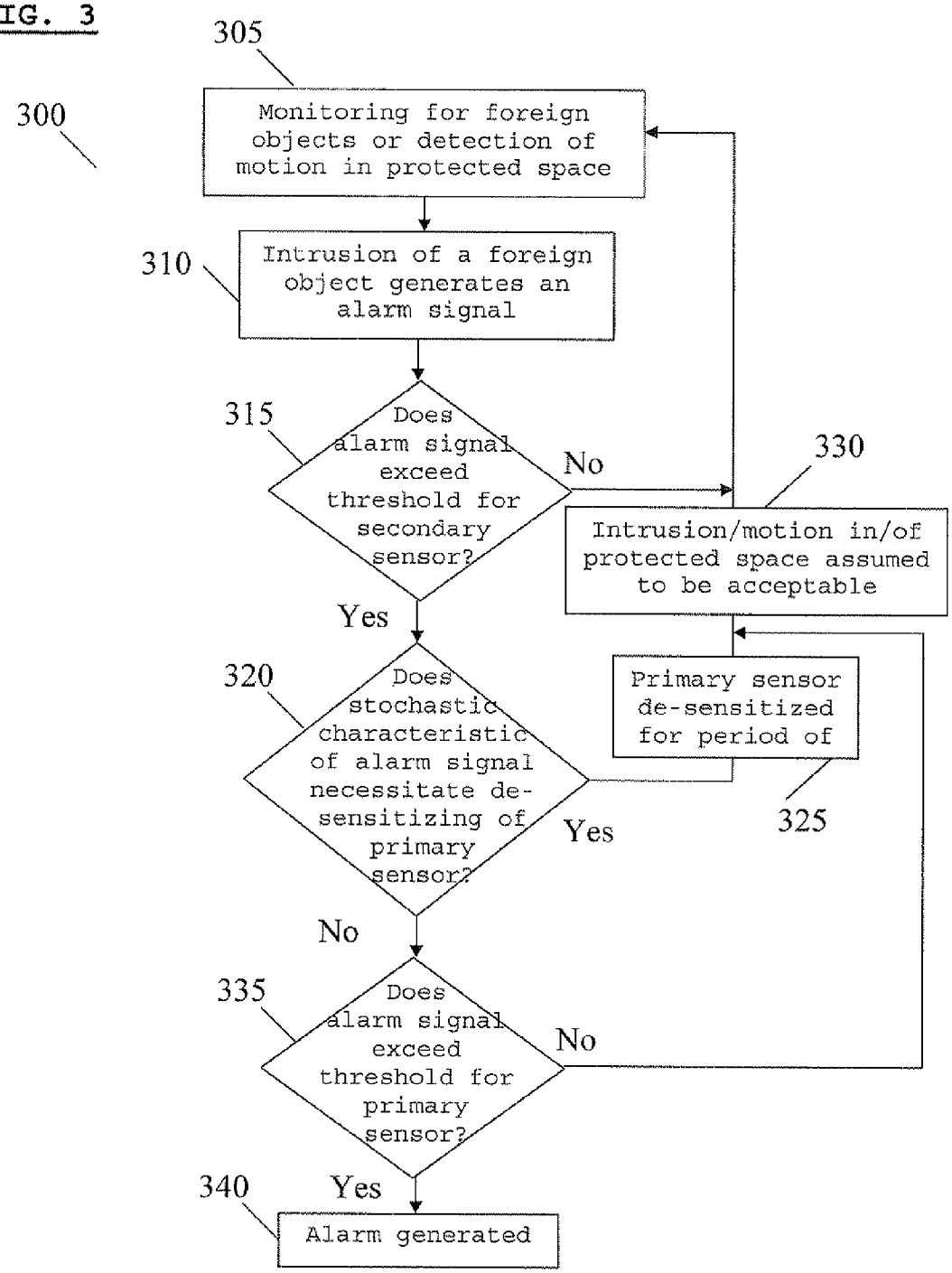

DETECTION SYSTEM AND METHOD FOR DETERMINING AN ALARM CONDITION THEREIN

PRIORITY CLAIM

The present application claims priority to United Kingdom Application No. 0500392.6 entitled "Detection System And Method for Determining An Alarm Condition Therein."

FIELD OF THE INVENTION

The present invention relates to detection systems for detecting motion and or intrusions in a confined space and the implementation thereof. The invention is applicable to, but not limited to, motion detectors used as intruder alarms for vehicles.

BACKGROUND OF THE INVENTION

Currently available intrusion detection sensors/systems employed, for example, in the field of vehicle interior protection, suffer from false triggering and false alarms. These may be caused by footballs or similar objects hitting exterior surfaces, loose stones thrown up from passing vehicles, deliberate triggering of the alarm by rocking or striking the vehicle, thunderclaps, door-knocks from adjacent vehicles, etc. This often becomes more of a problem as a vehicle ages and interior trims and fittings become worn and loose. An intrusion sensor fitted to the vehicle may interpret these movements and vibrations as genuine intrusions.

In order to be sure that the sensor detects even small, slow moving 'real' intrusions into the protected vehicle, high sensitivities, i.e. high amplification gains, are required. This high sensitivity often degrades the false alarm immunity.

The functioning of a currently available motion detector used for monitoring the interior of a vehicle (or, say, other spatial areas such as rooms) can be described as follows: an air-ultrasonic carrier signal is projected into, and reflected around, the space that is to be protected. This signal is subsequently phase and/or amplitude modulated by any intrusion into the protected space, and any other "normal" motion of the vehicle as described above, before being received back at the ultrasonic receiver. "Normal" motion of the vehicle body can quite easily trigger the alarm, and such false alarms can be the cause of great annoyance to the general public.

As a result, many UK and foreign legislative and insurance rating bodies have included stringent checks for such problems in their vehicle certification tests. Non-compliance may cause a vehicle to either be considered unsuitable for sale, or to receive a higher than expected insurance rating.

Thus, a need exists for a method and means of improving the performance and reliability of motion detection systems, especially as regards false triggering of a detection system.

SUMMARY OF THE INVENTION

In accordance with a first aspect of the present invention, there is provided a method for determining an alarm condition, as claimed in claim 1.

In accordance with a second aspect of the present invention, there is provided a detection system, as claimed in claim 10.

In accordance with a third aspect of the present invention, there is provided a detection system, as claimed in claim 11.

In accordance with a fourth aspect of the present invention, there is provided a detector, as claimed in claim 18.

In accordance with a fifth aspect of the present invention, there is provided a signal processor, as claimed in claim 19.

Further aspects and advantageous features of the present invention are as described in the appended Claims.

A method according to the teachings of the current invention is described, for discriminating between various types of motions of objects or signal-source, as detected by an electromechanical, optical or other similar motion detection system. The detection system incorporates devices for detecting wideband electrical or electromagnetic signal or signals that contain stochastic information corresponding to one or more signal-sources. The detection devices produce raw signals, which are conditioned by amplification and filtering so as to separate the information contained therein into frequency-bands of interest. The information contained in the specific frequency bands or combinations thereof are interpreted as corresponding to specific types of source.

This novel method allows specific signal sources, e.g. the slow movement of a large object, and the rapid motion of a small object to be detected and discriminated with minimal added cost and complexity, thus significantly increasing the reliability and usefulness of such motion detection systems. Furthermore, the sources, once identified, can be used individually or in combination as triggers for the system, thereby significantly improving the ability of the system to discriminate between 'relevant' and 'irrelevant' events.

In a further advantageous embodiment of the present invention the wide-band signal is filtered into two frequency-bands of interest one at a low frequency, and one at a high frequency. The information contained in the high frequency band is used as the primary sensor and trigger source. The information contained in the low frequency band is used as a secondary sensor. The information obtained from the secondary sensor may be used to inhibit triggers generated by the primary sensor.

This significant improvement in the method of detection allows very specific kinds of objects in motion, i.e. signal sources, to be individually identified by inventive use of simple processing methods.

The secondary sensor operates at low frequency, for example in the frequency band at or below 20 Hz. Information regarding a signal source obtained from this sensor can, by means of a method according to the teachings of the present invention, be used, simply and advantageously, to enable or inhibit triggers generated by the primary sensor.

In a further advantageous embodiment of the present invention, signal detection in the secondary sensor system, for example above a threshold level set for the secondary sensor, may be used to inhibit triggering of the primary sensor for a pre-determined time.

Advantageously, the primary sensor is only continuously disabled in this way for a defined maximum time period, thus preventing the system from being permanently disabled.

The performance and reliability of the detection system is further enhanced, simply and advantageously, by the setting of the threshold-level and/or trigger-level for the secondary sensor system, i.e. the level at which a signal is considered to be present. This level is set below the threshold level at which the same signal-source, would cause a trigger in the primary sensor detection system. This advantageous feature allows the inhibit function to effectively mask any trigger due to detection in the primary sensor.

The teachings of the present invention are advantageously embodied in a motion detection device for vehicle-intrusion detection. The device comprises a primary detection mechanism such as an ultrasonic transmitter and receiver, and a signal processing function, being modified advantageously according to the teachings of the present invention to include a secondary detection mechanism. The secondary detection mechanism comprises a low frequency sensor and subsequent signal conditioning.

In a further advantageous embodiment, a microphone having a frequency response extending down to either 0 Hz or at least a very low frequency is employed, thus allowing any acoustic signals, vibrations or low frequency air-pressure changes to be detected.

The use of further types of sensor, such as an accelerometer, for directly detecting when a force is applied to an object in the vicinity of the detection system is described in a further advantageous embodiment of the present invention.

In a yet further advantageous embodiment, a vibration detector may be employed to directly detect very small motions of objects.

Furthermore, the use of a strain-gauge provides a simple and advantageous mechanism of detecting the application of a force or a pressure, whereby a shock detector can be used advantageously to identify short high energy impacts to objects or surfaces in the vicinity of the detector system.

The present invention also teaches, advantageously, that any combination of these sensory mechanisms may be employed for optimal detection reliability and performance.

A motion detection device, according to a further advantageous teaching of the present invention, employs a single detection mechanism with wideband frequency response. The wideband frequency is divided into distinct frequency bands such that respective detected signals can be isolated by band pass filtering and subsequent signal processing by a detector. In this way it is possible to significantly improve the performance and reliability of the detection system, whilst also simplifying its construction and its installation.

In yet a further advantageous embodiment of the teachings of the present invention, a motion detection device is described wherein high frequency signal is acquired by a sensor optimised for use at high frequency, whilst the low frequency signal is acquired by means of a sensor optimised for use at low frequency. In this way it is possible to build a motion detection device that benefits from the teachings of the present invention, whilst still utilising simple, readily available low cost components.

In this manner, the aforementioned problems associated with false triggers and poor reliability of motion detection systems is resolved. This has been achieved by modifying existing motion detection systems to employ at least a secondary sensor, whether physical or generated by electronic and/or signal processing means. The secondary and/or further sensor is used to detect the characteristic signatures of specific types of signal source, i.e. specific types of motion or physical effect of motion, and to use this information to significantly improve the ability of the detection system to discriminate between such sources.

BRIEF DESCRIPTION OF THE DRAWINGS

Exemplary embodiments of the present invention will now be described, by way of example only, with reference to the accompanying drawings, in which:

FIG. 3 illustrates a flowchart of a motion detection operation using primary and secondary detection in accordance with embodiments of the present invention.

DESCRIPTION OF EMBODIMENTS OF THE INVENTION

Embodiments of the present invention will be described in terms of an automobile intruder detection system. However, it will be appreciated that the inventive concepts may be embodied in any other type of motion detection system. The invention is particularly relevant to those types of detection systems that are 'resource constrained' in the sense that they must be of low cost, small size and minimal power consumption. The teachings of the present invention can be optimally applied to motion detection systems in which the protected or monitored space is an enclosed volume, such as that found in the interior of a vehicle or a room.

Figure 1:
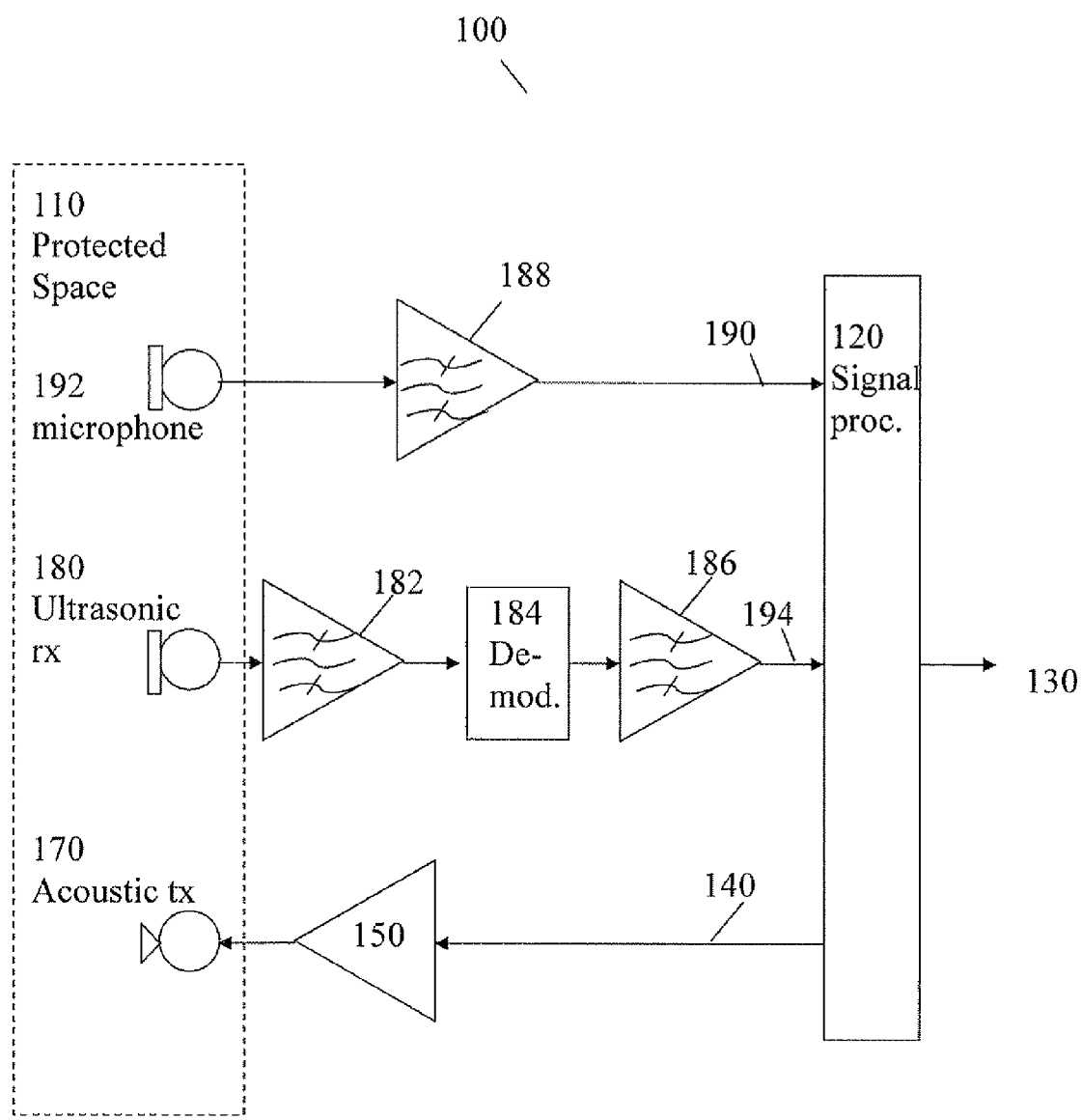
FIG. 1 illustrates a block diagram of a motion detection system adapted in accordance with one embodiment of the present invention.

FIG. 1 illustrates a functional block diagram of part of a motion detection system 100, adapted to support the inventive concepts of embodiments of the present invention. The system 100 comprises a processing function 120, which provides a signal for the ultrasonic acoustic transmitter 170, the signal first being conditioned or amplified by the driver/amplifier 150. This ultrasonic signal is transmitted or 'beamed' into the space that is to be monitored by the motion detection system 110, this space being known as the protected space.

The ultrasonic signal is reflected by objects within the protected space 110, and modulated, preferably both in phase and amplitude, by objects within the space that are in motion, i.e. signal modulation sources. An ultrasonic receiver 180 detects any reflected and modulated ultrasonic acoustic signals, and may generate an electrical signal proportional to the magnitude and phase of these signals. Signal conditioning, including a band pass filter/amplifier 182 is applied to the raw signal generated by the ultrasonic receiver 180. The subsequently amplified and frequency-limited signal is then demodulated in demodulation function 184 before further filtering and conditioning 186.

The resulting primary detection signal 194 is input to the signal processing function 120. It is envisaged that the signal processing function 120 may be a digital signal processor (DSP), whereby the primary detection signal 194 is digitised by means of an A/D converter prior to being further processed. The digitised signal may be processed immediately in real-time or time-stamped, stored in a memory element (not shown) associated with the processing function 120, and used at a later time.

The primary detection signal 194 may contain information relating to the signal source within the protected space 110, for example the information may include a hand, arm, or other 'grabbing' implement protruding into the protected space through a 'break-in' aperture (e.g. a smashed vehicle window aperture), in order to remove contents from the vehicle.

The information contained within the primary detection signal may comprise phase modulation of the returned carrier signal (relative to the transmitted carrier signal), amplitude modulation of the returned carrier signal, frequency shift of the returned carrier (e.g. from Doppler effects) or a mixture of all three. Such information indicates the presence of an intruding object, its position, its movement speed, size or a combination of all four.

A further (secondary) sensor, for example a microphone 192 with a low-frequency (LF) frequency response, picks up or detects LF vibrations. Such vibrations may be detected via its mounting, which may be a printed circuit board (PCB)/housing or substrate, and/or via changes in air pressure within the protected space 110. The low frequency information content is extracted from this signal using an active filter and amplifier 188, prior to entering the signal processor 120, for example via an analogue-to-digital (A/D) input of the signal processing function 120. The digitised signal may then be stored and processed by the processing function 120.

It is envisaged that the active filter may have a band-pass characteristic. The band-pass characteristic of the filter 188 will vary dependent upon the application, but will generally be set with an upper frequency limit of 20 Hz. A low-pass filter may be used, but this would depend on the DC content of the output of the microphone 192. For example, capacitor and Electret-type microphones usually employ a dc coupled JFET for output buffering, so the initial DC offsets, as well as drift over time, may cause problems in the amplification stages. An ac couple at the output of the microphone between the microphone and filter/amp will therefore generally be used, effectively forming a band-pass filter in conjunction with a low-pass filter 188.

As the vehicle soft trims and glazing tend to provide good attenuation of extraneous acoustic noise from outside the vehicle, a first-order filter response has been found to be generally adequate. The gain of the filter/amplifier combination 188 is set such that gentle impacts or firm sudden pressure exerted against the protected space walls in the case of a vehicle its body or glazing, produces a useable signal at the input of the signal processor function 120.

Within the signal processing function 120, the microphone signal at 190 is sampled at a suitable rate and threshold level. A de-bounce timing period is then applied in order to determine whether or not the input should be considered active. When an input continues to occur at a level greater than or equal to the threshold, for a period of time greater than or equal to the preset de-bounce period, it is considered to be 'active'.

If the secondary alarm signal 190 is considered active, it causes the signal processor to inhibit or partially inhibit operation of the primary sensor signal 194, e.g. disable a primary detection algorithm for a short predetermined period. Importantly, the threshold level at which the secondary alarm signal 190 generated by the LF detection circuit is considered active, must be set just below the threshold level at which the same body impact/vibration stimulus would cause a primary sensor detection signal 194.

The inhibit time may be extended if the signal 190 generated by the LF detection circuit is active for a period longer than the predetermined time. However, if this period is extended for too long, the signal processor function 120 will cause generation of an alarm output. This is a watchdog feature that prevents an intruder, who is attempting to access a vehicle, from using repeated impacts as a means of inhibiting the prime detector algorithm(s) completely.

A skilled artisan will appreciate that the devices used to derive the additional low frequency signal; the conditioning methods and the actual application are many and various.

For example, an accelerometer or vibration detector mounted in a suitable position on the walls or windows of the protected space may be used. Conditioning for this type of transducer would generally require a charge amplifier, but would be dependant on the transducer type. The output of the charge amplifier would then be low-pass or band-pass filtered prior to processing. The transducer mounting position chosen would need to be carefully evaluated in order to extract the best signal from all wall or glass areas around the protected space. This method effectively uses the walls or windows of the protected space as a 'microphone' diaphragm, which then transfers the received energy as vibrations to the accelerometer. This method could for example be employed for protection of a shop. With normal window breakage or space intrusion sensors (such as PIR or ultrasonic), strong impacts to the window glass may cause false alarm, due to the movements imparted into the glass being interpreted as a movement within the protected space.

By using the additional accelerometer, impacts to the glass that are not strong enough to cause breakage will be picked up much more strongly than by the prime sensor. These impacts may then be discriminated from real intrusions, which actually break through the glass, or real intrusions, which occur elsewhere in the protected area.

It is envisaged that a strain gauge may be used in exactly the same way as the accelerometer, with the mounting substrate once again acting as a microphone diaphragm. The conditioning used for this type of device is generally either a charge amplifier (for piezo types), or resistive bridge and amplifier (for resistive types). Once again, the output from the conditioner would be low-pass or band-pass filtered prior to processing.

In the herein described embodiment, a piezo MEMS microphone is added as the secondary detector, to detect body-coupled and air-coupled low frequency (<20 Hz) events. This microphone type is low cost, small, robust, has good low frequency response, high output and wide operating temperature range. Only a single stage amplifier is required with this device, to obtain a useable signal.

Figure 2:
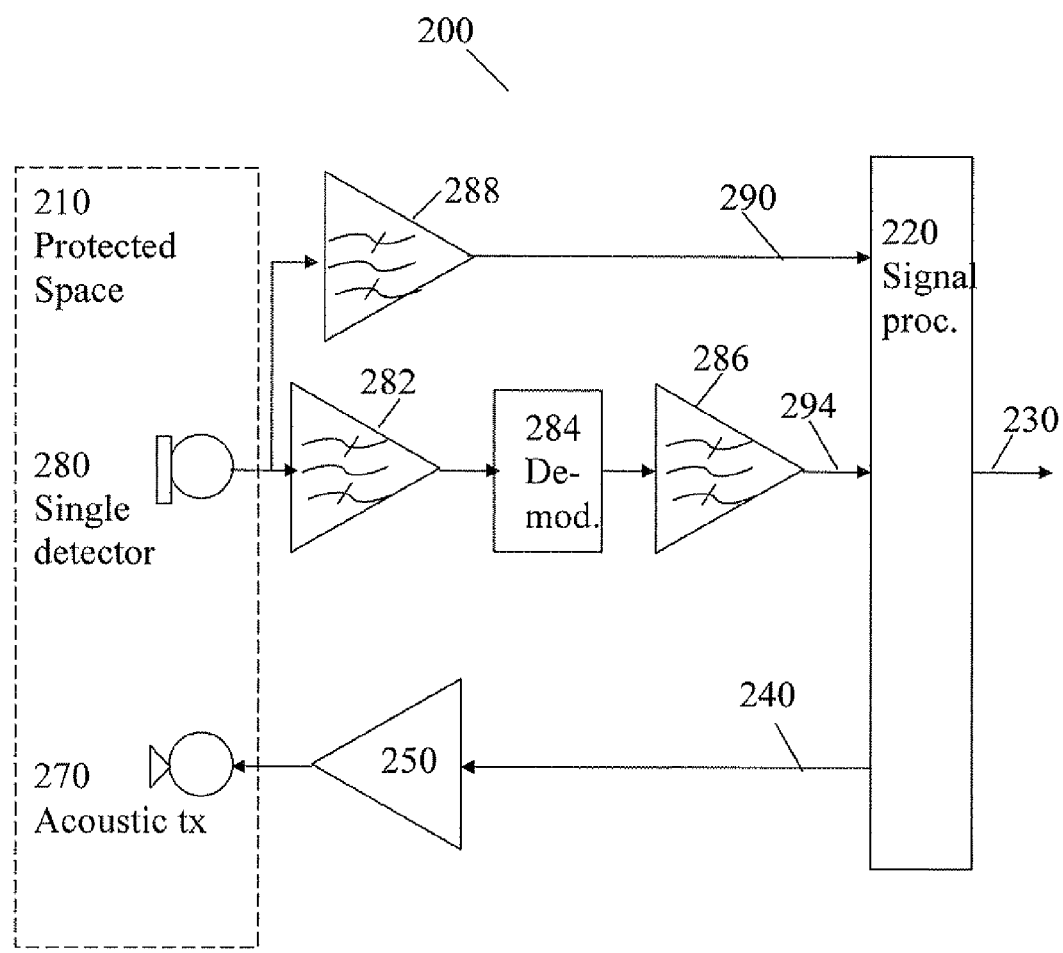
FIG. 2 illustrates a block diagram of a motion detection system adapted in accordance with an enhanced embodiment of the present invention.

FIG. 2 illustrates a detection system of an enhanced embodiment of the present invention. In this enhanced embodiment, a single detector 280 with a wideband frequency response replaces the two detectors 180 and 192 of FIG. 1. A skilled artisan will appreciate that the remaining components operate substantially the same as in the system of FIG. 1, and as such will not be described further here. The single detector 280 is capable of detecting the same range of frequencies as the combination of ultrasonic sensor 180 and LF microphone 192 of FIG. 1. In this enhanced embodiment, the motion detection system performs as described with regard to the system of FIG. 1, the significant difference being, that the secondary detection (inhibiting) signal is generated by a virtual sensor comprised of the wideband sensor 280 and the filter/amplifier combinations 282, 288 and subsequent signal processing.

Advantageously, this enhanced embodiment provides for a significant reduction in complexity of the system in terms of installation within a vehicle, due to the reduced number of sensors used.

Although the aforementioned embodiments are described with reference to the inhibiting of the primary sensor or detector upon determining a false alarm condition, a skilled artisan will appreciate that the inventive concepts apply equally to the inhibiting of the alarm itself.

It is also within the contemplation of the present invention that the information from the secondary sensor may also be used to simply desensitize, rather than completely inhibit, the primary sensor. The desensitization may take the form of either:

(i) Reducing the prime sensor sensitivity by one or more levels/stages, or (ii) By using an attenuation which is in proportion to the magnitude of the secondary signal.

It is also envisaged that the inhibition or desensitization of the prime sensor signal may be implemented either in hardware or software/firmware or a combination of these.

Referring now to FIG. 3, a flowchart 300 illustrates a motion detection operation using primary and secondary detection in accordance with embodiments of the present invention. The flowchart 300 commences with the protected space being monitored for an intrusion of foreign objects or detection of motion, as shown in step 305. If an intrusion of a foreign object is detected, or motion is detected, an alarm signal is generated in step 310 by a secondary sensor. The secondary sensor is configured to be more sensitive to motion than the primary sensor.

The alarm signal is then processed and the source of the signal interpreted. The interpretation may be made according to whether the signal exceeds a threshold level, in step 315, to avoid a noisy signal causing an activation of an alarm signal by either the primary or secondary sensor.

If the alarm signal does not exceed the threshold level, in step 315, the process returns to the monitoring step of 305. However, if the alarm signal does exceed the threshold level, in step 315, a determination is made by a signal processor as to whether the alarm signal necessitates inhibition of the primary sensor in step 320. If the determination in step 320 necessitates inhibition of the primary sensor in step 320, this inhibition is performed, for a period of time, in step 325. In this manner, it is assumed that the intrusion, or detection of motion, in protected space is acceptable, as shown in step 330. The process then returns to the monitoring step 305.

If the determination in step 320 does not necessitate inhibition of the primary sensor in step 320, the primary sensor is not inhibited and is allowed to detect any intrusion or motion, in step 335. If the primary sensor fails to detect any intrusion or motion, in step 335, the process moves to step 330 and it is assumed that the intrusion, or detection of motion, in protected space was acceptable. If the primary sensor detects an intrusion or motion, in step 335, an alarm is generated by the primary sensor, as shown in step 340.

It will be understood that the improved electric drive system for reducing emissions from a vehicle detection system and method for determining an alarm condition therein, as described above, aims to provide at least one or more of the following advantages:

(i) Improved reliability in signifying an alarm condition, by reducing the opportunity of false alarms;

(ii) Reduced component count when combining components of both primary and secondary sensors/detection systems; and (iii) Flexibility in being able to configure the detection system to adapt to, and recognise, a variety of potential alarm sources;

(iv) Reduction in general levels of noise pollution;

(v) Reduction of wasted public services time due to investigation of false alarms; and (vi) Reduction in warranty claims against security systems that use intrusion sensing technology.

Whilst the specific and preferred implementations of the embodiments of the present invention are described above, it is clear that one skilled in the art could readily apply variations and modifications that would still employ the aforementioned inventive concepts.

Thus, a method and apparatus for improving the reliability and performance of a motion detection system by employing a secondary sensor to provide further information concerning the nature of the detected signal have been described, where the aforementioned disadvantages with prior art arrangements have been substantially alleviated.

I claim:

1. A method for determining an alarm condition for a confined space, the method characterised by the steps of:
    detecting low frequency acoustic signals in the confined space by a secondary microphone sensor;
    generating an alarm signal by the secondary microphone sensor in response to detected low frequency acoustic signals;
    determining whether the alarm signal represents a false alarm condition by filtering the detected alarm signal into one of two or more frequency bands to discriminate between various types of signal-source, such that a low frequency of the two or more frequency bands represents an alarm signal from the secondary microphone sensor, and a high frequency of the two or more frequency bands represents an alarm signal from a primary alarm sensor; and
    de-sensitizing the primary alarm sensor in response to the determined false alarm condition at the high frequency band.

2. A method according to claim 1 further characterised in that the alarm signal comprises stochastic information corresponding to one or more sensors.

3. A method according to claim 1 further characterised in that the step of determining whether the alarm signal represents a false alarm condition comprises determining whether the alarm signal exceeded a threshold or trigger level.

4. A method according to claim 3 further characterised in that the threshold or trigger level for the secondary microphone sensor is set below a threshold level at which the same signal source would cause a trigger of the primary sensor.

5. A method according to claim 1 further characterised in that the step of de-sensitizing comprises a step of de-sensitizing a primary sensor for a pre-determined time.

6. A method according to claim 1 further characterised by a step of triggering an alarm in response to an alarm signal being generated by a primary sensor and a secondary microphone sensor.

7. A detection system determining an alarm condition for a confined space and arranged to perform the method steps of claim 1.

8. A detection system for determining an alarm condition within a confined space comprising a primary alarm sensor, the detection system characterised by:
    a secondary alarm microphone sensor arranged to generate an alarm signal in response to detected low frequency acoustic signals in the confined space; and
    a signal processor operably coupled to the primary alarm sensor and secondary alarm microphone sensor, and configured to determine whether the alarm signal represents a false alarm condition by discriminating between various types of signal sources, and
    a filter operably coupled to the signal processor and arranged to discriminate between various types of signal source by filtering alarm signals having different frequency responses into two or more frequency bands,
    wherein the signal processor interprets an alarm signal filtered at a low frequency as representing an alarm signal from the secondary sensor, and a signal filtered at a high frequency as representing an alarm signal from the primary alarm sensor and performs a de-sensitize operation of the primary alarm sensor in response to the determined false alarm condition at the high frequency band.

9. A detection system according to claim 8 further characterised in that the primary alarm sensor comprises a primary detector that is an ultrasonic transmitter.

10. A detection system according to claim 8 further characterised in that the alarm signal comprises stochastic information corresponding to one or more sensors.

11. A detection system according to claim 8 further characterised in that a single detector with a wideband frequency response performs the function of the primary detector and the secondary detector.

12. A microphone detector arranged to generate an alarm signal in response to detected low frequency acoustic signals in a confined space in the detection system according to claim 8.

13. A signal processor arranged to process detected low frequency acoustic signals in the detection system according to claim 8.

* * * * *